United States Patent [19]

Deem et al.

[11] 4,013,954
[45] Mar. 22, 1977

[54] SPEED SENSOR ASSEMBLY

[75] Inventors: Brian C. Deem; Gilbert A. Pataky; George W. Thompson, all of Elyria, Ohio

[73] Assignee: The Bendix Corporation, South Bend, Ind.

[22] Filed: June 21, 1974

[21] Appl. No.: 481,938

[52] U.S. Cl. ............................ 324/173; 310/168
[51] Int. Cl.² ................... G01P 3/48; H02K 19/20
[58] Field of Search ............... 324/166, 174, 173; 310/67, 168

[56] References Cited

UNITED STATES PATENTS

| | | | |
|---|---|---|---|
| 3,431,444 | 3/1969 | Wilson | 310/168 |
| 3,473,120 | 10/1969 | Ruof | 324/174 |
| 3,678,386 | 7/1972 | Miles | 324/174 |
| 3,683,219 | 8/1972 | Kruse | 310/168 |
| 3,760,210 | 9/1973 | Abate | 310/168 |
| 3,772,550 | 11/1973 | Anselmino | 310/68 |
| 3,774,061 | 11/1973 | Fiteny et al. | 310/168 |

Primary Examiner—John K. Corbin
Assistant Examiner—Rolf Hille
Attorney, Agent, or Firm—Ken C. Decker; William N. Antonis

[57] ABSTRACT

A speed sensor for an adaptive braking system is disclosed. The sensor is enclosed in a housing, so that all critical adjustments may be made at the time the sensor is manufactured and not when the sensor is installed on the vehicle. The entire sensor package is small enough to be mounted within the tubular axle used on many relatively large vehicles, such as semi-trailers, which are in use today. A driving connection is provided between the speed sensor and the hub cap of the vehicle, which of course, rotates with the corresponding vehicle wheel.

9 Claims, 2 Drawing Figures

SPEED SENSOR ASSEMBLY

BACKGROUND OF THE INVENTION

This invention relates to a speed sensor assembly for an automotive adaptive braking system.

Existing vehicle speed sensors include a tone wheel of a relatively large diameter and an electromagnetic pickup device which must be mounted on a non-rotative portion of the vehicle adjacent the tone wheel, which, of course, is mounted for rotation with the corresponding vehicle wheel. The spacing between the sensor pickup and the tone wheel is extremely critical, and has customarily been set when the vehicle is assembled. Of course, since the tone wheel rotates with the vehicle wheel, which may deflect relative to the sensor, this distance may vary during the life of the vehicle. Furthermore, since both the tone wheel and the sensor pickup are exposed on the underside of the vehicle, the rather adverse environment in which they must operate sometimes causes problems.

The present invention relates to a speed sensor which uses a small diameter tone wheel and an electromagnetic pickup device which are mounted in a housing with all critical dimensions established at the time of manufacture of the speed sensor and not at the time that the speed sensor is installed on the vehicle. Furthermore, the entire package consisting of the tone wheel and electromagnetic pickup is designed to be installed in the protected environment within the tubular axle used on many relatively large vehicles, such as semi-trailers. A tone wheel is rotated by a drive connected to the vehicle hub cap which, of course, rotates with the vehicle wheel.

SUMMARY OF THE INVENTION

Therefore, an important object of our invention is to provide a speed sensor for a vehicle adaptive braking system which is wholly contained within an integral housing which is in turn mounted within a tubular vehicle axle.

Another important object of our invention is to design a speed sensor which may be located in a portion of the vehicle where it is protected from the adverse environment existing on the underside of the vehicle.

Another important object of our invention is to provide a speed sensor in which the critical gap between the electromagnetic pickup and the tone wheel may be preset at the time the speed sensor is manufactured and which does not require any dimensions to be established at the time that the speed sensor is installed upon the vehicle.

Another important object of our invention is to design a speed sensor which does not require removal of the vehicle wheel for servicing.

Another important object of our invention is to provide a speed sensor which is driven by a connection between the sensor and the hub cap of the corresponding vehicle wheel.

DETAILED DESCRIPTION

Figure 1:
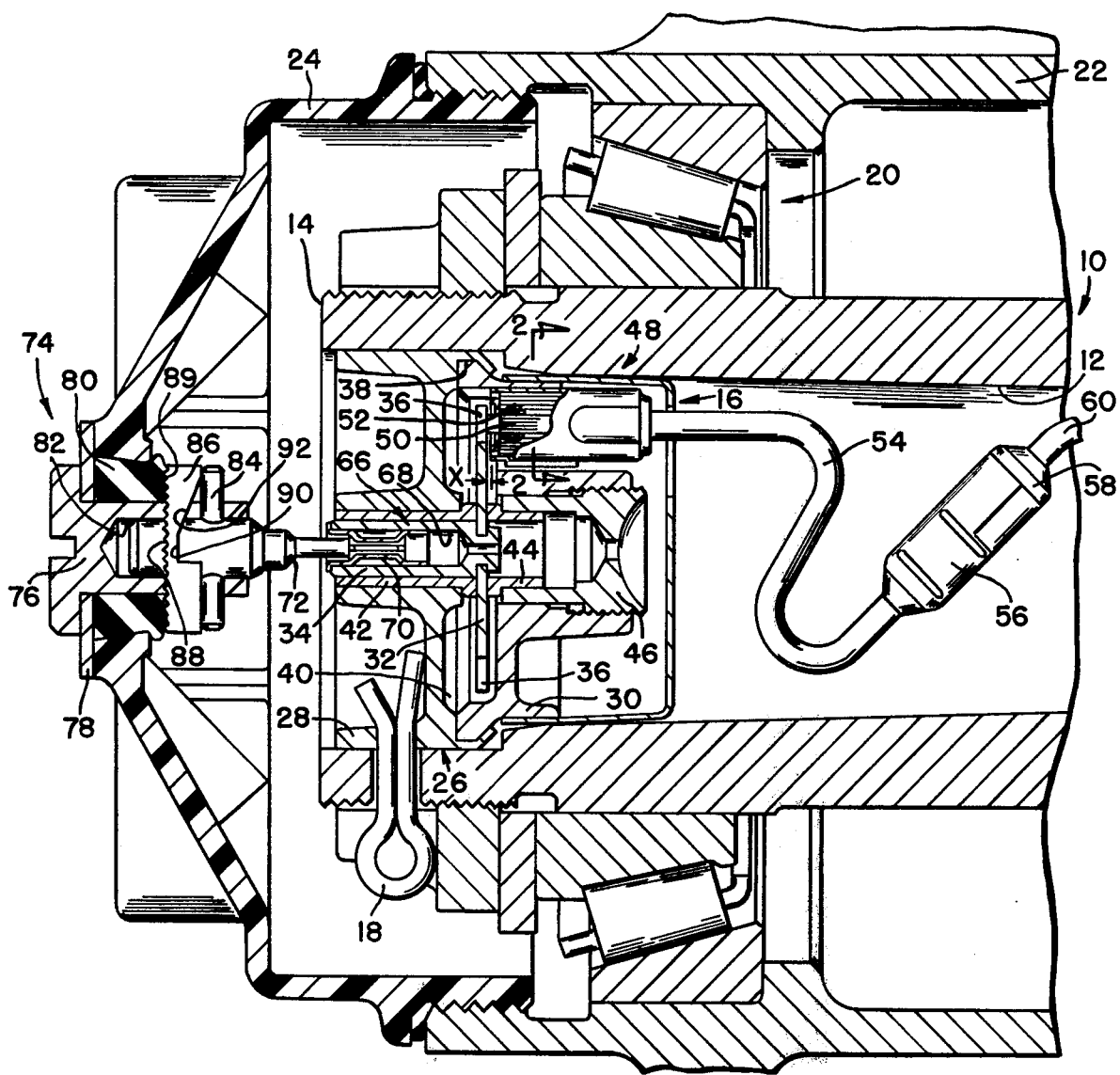
FIG. 1 is a cross-sectional view taken through a vehicle axle and wheel assembly in which a speed sensor assembly made pursuant to the teachings of our present invention is installed.
Figure 2:
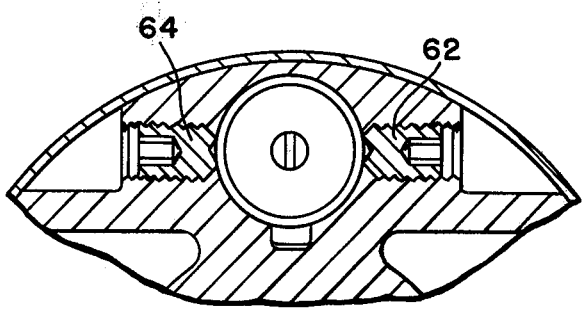
FIG. 2 is a fragmentary cross-sectional view taken substantially along lines 2—2 of FIG. 1.

Referring now to the drawings, a vehicle axle generally indicated by the numeral 10 defines a bore 12 which terminates at the open end 14 of the axle 10. A speed sensor assembly generally indicated by the numeral 16 is mounted in the bore 12 adjacent the open end 14 and is held in position against movement with respect to the axle 10 by a cotter key 18 which extends through the wall of the housing and engages the sensor assembly 16. A bearing generally indicated by the numeral 20 mounts a wheel 22 for rotation about the axle 10. A hub cap 24 is mounted for rotation with the wheel 22 and extends across the open end 14 of the axle 10. Conventionally, the hub cap 24 is sealed against the wheel 22 so that the compartment defined within the hub cap may be filled with lubricating oil so that bearing 20 runs in an oil bath.

The sensor assembly generally indicated by the numeral 16 includes a support 26 which includes a front body assembly 28 and a rear body assembly 30. A tone wheel 32 is located between the body assemblies 28 and 30 and is fixed to a shaft 34 which is rotatably supported in the body assembly 28 so that the tone wheel 32 may rotate relative to the body assemblies 28 and 30. The tone wheel 32 is of conventional construction of a type well known to those skilled in the art, and consists merely of a flat, circular disc which is provided with serrations on the outer periphery thereof to define teeth 36. As can be seen in FIG. 1, the body assemblies 28 and 30 extend over the periphery of the tone wheel 32 and are joined together as at 38, to define an enclosed, protected compartment 40 in which the tone wheel 32 rotates. A front thrust bearing 42 is adapted to engage one face of the tone wheel 32 and is supported in the body assembly 28. A rear thrust bearing 44 is mounted in a nut 46 which is threadedly engaged with the rear body assembly 30. Of course, the nut 46 may be screwed with respect to the body assembly 30, thereby moving the nut 46 along the axis of rotation of the tone wheel 32, to move the rear thrust bearing 44 toward and away from the corresponding rear face of the tone wheel 32. When the sensor assembly 16 is assembled, the position of the nut 46 is adjusted so that the thrust bearing 44 is brought into a position establishing a minimum running clearance between the tone wheel 32 and the thrust bearings 42 and 44. The nut 46 is then staked to lock the latter in place.

An electromagnetic pickup assembly generally indicated by the numeral 48 is carried in the rear body assembly 30 and includes a magnetic pole piece 50 which is surrounded by a coil 52. The left hand end (viewing the Figure) of the pole piece 50 projects from the coil 52 and is separated from the toothed portion of the tone wheel 32 by a distance X. As will be appreciated by those skilled in the art, the dimension X is a very critical dimension, as the signals generated by the magnetic pickup 48 may be affected by small changes in the distance X. As is also well known to those skilled in the art, rotation of the tone wheel 32 about its rotational axis alternately brings the solid teeth 36 and the spaces therebetween across the end face of the pole piece 50. Since the reluctance of the magnetic path changes appreciably depending upon whether the solid portion of the tone wheel or one of the intervening gaps are disposed adjacent the end face of the pole piece 50, a pulsed signal is generated in the coil 52 which is transmitted to the appropriate electronic control.

When the speed sensor assembly 16 is installed on the vehicle, coil 52 is connected to the aforementioned control unit through lead 54 connected to the coil 52 and connector 56 which is joined with connector 58 and lead 60. During assembly of the sensor 16, the electromagnetic pickup 48 is movable axially with respect to the tone wheel 32 so that the gap X may be adjusted. When this gap is correctly adjusted, and when the appropriate electrical checkouts are made, the electro-magnetic pickup 48 is locked in place by set screws 62, 64 which are threadedly engaged with the rear body assembly 30 and are adapted to engage the outer circumferential surface of the pickup 48. Consequently, the critical gap X is established upon manufacture of the sensor 16 and before the latter is shipped to the vehicle manufacturer for installation on the vehicle body. Consequently, it is not necessary that the critical gap X be set when the sensor is installed upon the vehicle.

A socket 66 is disposed within the recess 68 defined within the shaft 34 and is provided with a portion 70 extending along the axis of the shaft which has a polygonal cross section. The socket 66 is force fitted in the recess 68, so that rotation of the socket will cause a rotation of the shaft 34 and therefore will rotate the tone wheel 32. The polygonal portion 70 of socket 66 is adapted to slidingly receive a drive element or pin 72 which has a corresponding polygonal cross section which is complementarily received within the portion 70. Because the portion 70 extends along the axis of the shaft and because the socket slidably receives the pin 72, the pin 72 can slide along the axis of rotation of the tone wheel 32 while maintaining a driving connection therewith. The opposite end of the pin 72 is connected to the hub cap 24, so that as the hub cap rotates with the wheel 22, rotation of the hub cap will be transmitted to rotate the tone wheel 32.

The drive pin 72 is engaged with the hub cap 24 by connecting means generally indicated by the numeral 74. As pointed out hereinabove, the compartment defined within the hub cap 24 is conventionally filled with oil or other lubricating medium. Consequently, a fill screw 76 is conventionally provided in the hub cap 24 for inspecting and filling the compartment defined within the hub cap 24 with the lubricating medium. A washer 78 is disposed between the head of the screw 76 and the outer face of the hub cap 24. A deformable seal 80 is disposed around the periphery of the shank of the screw 76. The left hand end of the drive pin 72 is received within a recess 82 in the screw 76, and a roll pin 84 interconnects the pin 72 and screw 76. A camming plate 86 is disposed between the roll pin 84 and the seal 80, and the left hand face 88 of the camming plate 86 is provided with serrations 89 which grippingly engage the sealing material 80 to restrict rotation of the cam plate 86 relative to the hub cap 24. The cab plate 86 is provided with a recess 90 and a camming surface 92. Upon initial assembly of the device, the fill screw 76 is inserted through the hub cap 24, and the roll pin 84 is disposed within the recess 90. The screw 76 is then turned manually, to urge the roll pin up the camming surface 92 to thereby lock the drive pin 72 for rotation with screw 76. Thereafter, the fill screw 76 and drive pin 72 rotate with the hub cap 24. Because of the polygonal interconnection between the drive pin 72 and the polygonal portion 70 of the socket 66, rotation of the wheel 22 transmitted through the hub cap 24 is further transmitted through the drive pin 72 to rotate the tonewheel 32 at the same rotational rate that the wheel 22 rotates. As pointed out herein-above, the rotation of the tone wheel 32 alternately brings the teeth 36 and the intervening spaces between the teeth past the left hand end of the pole piece 50. The constantly changing reluctance path due to the alternating spaces and solid teeth generates a pulsed signal in the coil 52 which is transmitted to the appropriated electronic control unit (not shown) through the leads 54, 60.

As was also pointed out hereinabove, the sensor assembly 16 is shipped as a unit to the vehicle manufacturer. When the vehicle is assembled, the appropriate electrical connectors 56 and 58 are joined together, and the assembly 16 is then placed in position illustrated in the drawings. The cotter key 18 then joins the assembly 16 to the axle 10 and consequently prevents relative rotation and relative axial movement therebetween. The hub cap 24 is then installed upon the wheel, and the drive pin 72 is engaged in the socket 66, to thereby complete the installation of the speed sensor 16.

We claim:
1. In a vehicle having a non-rotative axle, a vehicle wheel rotatably mounted on said axle, said axle defining a bore therewithin, and means for measuring the rotational velocity of said vehicle wheel, said measuring means being mounted within said bore and enclosed by said axle, said measuring means including a support, a tone wheel rotatably mounted on said support for rotation about the axis of the tone wheel, means mounting said support within said bore and substantially preventing movement of said support with respect thereto, means drivingly interconnecting said tone wheel with said vehicle wheel, and electromagnetic means mounted on said support adjacent said tone wheel for generating electrical signals proportional to the rotational velocity of said tone wheel, a hub cap mounted for rotation with said vehicle wheel, said hub cap extending across the end of said axle, said drivingly interconnecting means being mounted on said hub cap and drivingly connected with said tone wheel for driving the latter with said vehicle wheel, said drivingly interconnecting means including a releasable connection to permit separation of the drivingly interconnecting means when the hub cap is removed.

2. The invention of claim 1:
said drivingly interconnecting means including a socket carried by the tone wheel and a pin carried by said vehicle wheel for engagement with the socket.

3. The invention of claim 2:
said tone wheel having a shaft rotatably supported by said support, said socket being carried by said shaft and being coaxial therewith.

4. The invention of claim 3:
said socket extending along the axis of the shaft and slidably receiving said pin so that the pin can slide axially with respect to the tone wheel for a limited distance while maintaining a driving connection therebetween.

5. The invention to claim 4:
said socket and said pin having complementary polygonal cross sections to prevent relative rotation of the pin in the socket.

6. In a vehicle having a non-rotative axle, a vehicle wheel rotatably mounted on said axle, said axle defining a bore therewithin, and means for measuring the rotational velocity of said vehicle wheel, said measuring means being mounted within said bore and enclosed by said axle, said measuring means including a support, a tone wheel rotatably mounted on said support for rotation about the axis of the tone wheel, means mounting said support within said bore and substantially preventing movement of said support with respect thereto, means drivingly interconnecting said tone wheel with said vehicle wheel, and electromagnetic means mounted on said support adjacent said tone wheel for generating electrical signals proportional to the rotational velocity of said tone wheel, a hub cap mounted for rotation with said vehicle wheel, said hub cap extending across the end of said axle, said drivingly interconnecting means being mounted on said hub cap and drivingly connected with said tone wheel for driving the latter with said vehicle wheel, said support including front and rear body assemblies, said tone wheel being disposed between said assemblies, one of said body assemblies extending across the periphery of the tone wheel to engage the other body assembly to thereby define an enclosed compartment within said support housing said tone wheel, said electromagnetic pickup means being housed within one of said body assemblies and projecting into said compartment, means for adjusting the axial position of said tone wheel with respect to said body assemblies, said axially adjusting means including a front thrust bearing carried by said front body assembly, a rear thrust bearing carried by said rear body assembly, and axially adjustable means carried by one of said body assemblies for adjusting the relative positions of said thrust bearing.

7. The invention of claim 6:
said means rotatably mounting said tone wheel including a shaft rotatably mounted on said support, said tone wheel being mounted on said shaft for rotation therewith;
said shaft including means for connection with said drivingly interconnecting means.

8. The invention of claim 6:
said means rotatably mounting said tone wheel including a shaft rotatably mounted on said support, said tone wheel being mounted on said shaft for rotation therewith, said shaft having a socket mounted for rotation therewith;
said drivingly interconnecting means including an element connected for rotation with said vehicle wheel and received in said socket.

9. The invention of claim 7; and
means connecting said element with said hub cap, said last-mentioned means including a manually manipulable means accessible from the exterior of the hub cap connected with said drive element, a transversely extending pin carried by said element and said manually manipulatable means, a cam plate having a recess and a camming surface disposed adjacent the pin, said pin upon rotation of the manually manipulatable means being urged up said camming surface from said recess to thereby lock the element for rotation with the hub cap.

* * * * *